United States Patent
Mattern et al.

(10) Patent No.: US 11,542,104 B2
(45) Date of Patent: Jan. 3, 2023

(54) ORDER-PICKING SYSTEM

(71) Applicant: Liebherr-Verzahntechnik GmbH, Kempten (DE)

(72) Inventors: Thomas Mattern, Rieden (DE); David Hänschke, Altusried (DE); Michael Kluge, Kempten (DE); Regina Krause, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 1081 days.

(21) Appl. No.: 16/302,937

(22) PCT Filed: May 17, 2016

(86) PCT No.: PCT/EP2016/000818
§ 371 (c)(1),
(2) Date: Nov. 19, 2018

(87) PCT Pub. No.: WO2017/198280
PCT Pub. Date: Nov. 23, 2017

(65) Prior Publication Data
US 2020/0180874 A1    Jun. 11, 2020

(51) Int. Cl.
*B65G 47/90* (2006.01)
*B65G 1/137* (2006.01)
*B65G 47/52* (2006.01)

(52) U.S. Cl.
CPC ......... *B65G 47/905* (2013.01); *B65G 1/1376* (2013.01); *B65G 1/1378* (2013.01);
(Continued)

(58) Field of Classification Search
CPC ...... G06Q 10/087; G06Q 10/08; G06Q 50/28; B65G 47/52; B65G 1/1378; B65G 1/137; B65G 1/1376
See application file for complete search history.

(56) References Cited

U.S. PATENT DOCUMENTS 6,061,607 A    5/2000  Bradley et al.
7,146,706 B2   12/2006 Du et al.
(Continued)

FOREIGN PATENT DOCUMENTS

DE      10019632 A1    10/2001
DE    102008046325 A1   3/2010
(Continued)

OTHER PUBLICATIONS

ISA European Patent Office, International Search Report Issued in Application No. PCT/EP2016/000818, dated Feb. 14, 2017, WIPO, 4 pages.
(Continued)

*Primary Examiner* — Timothy R Waggoner
(74) *Attorney, Agent, or Firm* — McCoy Russell LLP (57) ABSTRACT

The present invention relates to a picking system for a job-related picking of goods in output bins, said picking system comprising a plurality of automated picking cells; comprising a first conveying system for the supply and/or discharge of the supply bins to and/or from the picking cells; and a second conveying system for the supply and/or discharge of the output bins to and/or from the picking cells, and a job management control for working through a plurality of picking jobs by controlling the first and second conveying systems and the plurality of picking cells, wherein at least one first picking cell has different goods handling properties than a second picking cell; and/or in that the job management control uses at least one first picking cell for working through different jobs and/or partial jobs than a second picking cell.

19 Claims, 5 Drawing Sheets

(52) U.S. Cl.
CPC ...... *B65G 47/52* (2013.01); *B65G 2203/0233* (2013.01); *B65G 2209/02* (2013.01); *B65G 2209/10* (2013.01)

(56) References Cited

U.S. PATENT DOCUMENTS

| | | | |
|---|---|---|---|
| 8,326,679 | B1 | 12/2012 | Rowe et al. |
| 9,390,748 | B1 | 7/2016 | Kritchevsky |
| 9,733,646 | B1* | 8/2017 | Nusser ................... B65G 1/137 |
| 9,958,851 | B2 | 5/2018 | Mattern et al. |
| 10,026,044 | B1 | 7/2018 | Wurman et al. |
| 2011/0170998 | A1 | 7/2011 | Winkler |
| 2013/0110280 | A1 | 5/2013 | Folk |
| 2014/0017048 | A1 | 1/2014 | Mattern et al. |
| 2014/0121836 | A1 | 5/2014 | Ban |
| 2014/0157732 | A1 | 6/2014 | Gasber |
| 2014/0234066 | A1 | 8/2014 | Mathi et al. |
| 2014/0244026 | A1 | 8/2014 | Neiser |
| 2015/0032252 | A1 | 1/2015 | Galluzzo et al. |
| 2015/0057793 | A1* | 2/2015 | Kawano ................... B25J 15/06 700/216 |
| 2015/0346708 | A1* | 12/2015 | Mattern ................. G05B 19/19 700/114 |
| 2016/0244262 | A1* | 8/2016 | O'Brien ..................... B25J 9/16 |
| 2016/0347545 | A1* | 12/2016 | Lindbo ................. B65G 1/1378 |
| 2017/0043953 | A1 | 2/2017 | Battles et al. |
| 2017/0136632 | A1 | 5/2017 | Wagner et al. |
| 2017/0349385 | A1* | 12/2017 | Moroni ................... B65B 35/36 |
| 2021/0394364 | A1* | 12/2021 | Ogawa ................... B25J 9/1664 |

FOREIGN PATENT DOCUMENTS

| | | |
|---|---|---|
| DE | 102009023808 A1 | 12/2010 |
| DE | 102010002317 A1 | 8/2011 |
| DE | 102014008108 A1 | 12/2015 |
| EP | 2650237 A1 | 10/2013 |
| WO | 2014166650 A1 | 10/2014 |
| WO | 2015118171 A1 | 8/2015 |

OTHER PUBLICATIONS

ISA European Patent Office, International Search Report Issued in Application No. PCT/EP2016/000819, dated Feb. 14, 2017, WIPO, 10 pages.

United States Patent and Trademark Office, Office Action Issued in U.S. Appl. No. 16/303,091, filed May 19, 2020, 31 pages.

* cited by examiner

ORDER-PICKING SYSTEM

CROSS-REFERENCE TO RELATED APPLICATION

The present application is a U.S. National Phase of International Patent Application Serial No. PCT/EP2016/000818, entitled "ORDER-PICKING SYSTEM," filed on May 17, 2016. The entire contents of the abovementioned application is hereby incorporated by reference in its entirety for all purposes.

TECHNICAL FIELD

The present invention relates to a picking system for a job-related picking of goods in output bins.

BACKGROUND AND SUMMARY

Conventional picking systems are known from DE 10 2008 046 325 A1. A picking system is based on a picking cell having a fully automatic gripping unit that can grip goods that are provided by a first conveying system and can transfer them to a second conveying system or to output bins arranged thereon. The goods can be provided in supply bins that are transported to the first picking cell via the first conveying system. An object detection device is arranged upstream of the gripper unit to detect the supplied goods and to control the gripper accordingly.

In one of the embodiments shown in DE 10 2008 046 325 A1, a plurality of such picking cells are arranged next to one another along the first conveying system. The individual picking cells can hereby work through parallel jobs.

An apparatus for an automated removal of workpieces arranged in a bin is known from DE 10 2014 008 108 A1. It has a supply module, a handling module, and an output module. However, the apparatus does not serve the picking of goods.

It is the object of the present invention to improve the efficiency of a picking system and/or to expand the spectrum of the goods that can be picked by such a system.

The present invention comprises a picking system for a job-related picking of goods in output bins. The picking system comprises a plurality of automated picking cells in which goods are removed from supply bins and are transferred into an output bin, wherein the picking cells each have an object detection device for detecting the goods in a supply bin, a gripper for removing the goods from a supply bin, and a cell control for evaluating the data of the object detection device and for path planning and for a control of the gripper. The picking system furthermore comprises a first conveying system for supplying and/or discharging the supply bins to and/or from the picking cells. The picking system furthermore comprises a second conveying system for supplying and/or discharging the output bins to and/or from the picking cells. A job management control for working through a plurality of picking jobs by controlling the first and second conveying systems and the plurality of picking cells is furthermore provided. The picking system in accordance with the invention is characterized in a first variant in that at least one first picking cell has different goods handling properties than a second picking cell. In a second variant, the picking system is characterized in that the job management control uses at least one first picking cell for working through different jobs and/or partial jobs than a second picking cell. The first and second variants can be implemented separately from one another. Both variants are, however, preferably implemented in combination.

The system preferably has more than two picking cells that are used in parallel and/or in series for working through jobs and/or partial jobs. The system can in particular have more than 4 picking cells, preferably more than 8 picking cells.

Furthermore, more than two picking cells each having different properties can also be provided and/or more than two picking cells for working through respective different jobs and/or partial jobs can be used, for example more than 3 or more than 4 picking cells that each have different properties and/or more than 3 or more than 4 picking cells that are used for working through respective different jobs and/or partial jobs can be used.

The range of goods that can be picked using the picking system can be expanded by the use of picking cells having different goods handling properties and/or by the use of individual picking cells for different jobs and/or partial jobs. Alternatively or additionally, the efficiency of the system can be improved by a use of the picking cells adapted more exactly to the individual goods.

In a preferred embodiment of the first variant of the present invention, the first picking cell has a different gripper and/or a different maximum handling weight than the second picking cell.

A wider range of goods can be picked by the use of picking cells having different grippers. Goods that can be picked better with a specific gripper are preferably allocated to the corresponding picking cell for picking.

A wider range of goods can likewise be picked by the use of picking cells having different maximum handling weights. Different robots can in particular be used at which the respective gripper is arranged. The robots can in particular have different maximum handling weights.

A first picking cell can thus, for example, be used for the handling or picking of goods within a first weight range and the second picking cell can be used for handling goods within a second weight range, with the two weight ranges differing. The first picking cell can in particular be configured such that it can also handle very light goods while the second picking cell can be configured so that it can also handle very heavy goods.

Alternatively or additionally, the first and second picking cells can permit the picking of goods of different sizes and/or the filling of output bins of different sizes. The first picking cell can in particular handle goods and/or output bin in a first size range and the second picking cell can handle goods and/or output bins in a second size range, with the first and second size ranges differing.

In a preferred embodiment of the present invention, the first and second size ranges and/or the first and second weight ranges overlap. There is thus a first group of goods and/or output bins that can only be handled by the first picking cell, a second group of goods and/or output bins that can only be handled by the second picking cell, and a third group of goods and/or output bins that can be handled both by the first and second picking cells.

The second variant of the picking system in accordance with the invention is preferably configured such that the job management control uses the first picking cell for picking a first sub-group of goods and the second picking cell for picking a second sub-group of goods.

The first and second sub-groups preferably differ with respect to predefined goods properties. These goods properties can be the weight and/or the size and/or the shape and/or the packaging properties and/or the kind of goods.

The association of the goods of a job with different picking cells preferably takes place on the basis of the goods properties.

The first and second sub-groups can have an intersection of goods that can be associated by the job management control either with the first picking cell or with the second picking cell for picking with reference to different criteria.

Alternatively or additionally, the job management control can use the first picking cell for the picking of a first sub-group of jobs or partial jobs and can use the second picking cell for the picking of a second sub-group of jobs or partial jobs. The first and second sub-groups preferably differ with respect to predefined job properties. These job properties can in particular be the number and/or the weight and/or the size and/or the shape and/or the packaging properties and/or the kind of goods to be picked per job or partial job and/or a priority of the job or partial job.

A job or partial job preferably comprises the picking of a plurality of different goods, i.e. the loading of an output bin with a plurality of different goods. The association of a job and/or partial job with a picking cell preferably takes place while taking account of properties that relate to or result from a plurality of goods of such a job and/or partial job. They can in particular be the number and/or the total weight and/or the total volume of the goods to be picked for this job or partial job. Furthermore, a different allocation to the picking cells can take place on the basis of the priority of a job or partial job.

In a preferred embodiment of the present invention, the first and second conveying systems are configured such that the first and second picking cells can be used both in parallel for working through different jobs and/or partial jobs and for a consecutive working through of a first and second partial job of a job. Depending on the job situation and/or on the configuration of the respective jobs the two picking cells can be used to load mutually separate output bins in parallel for working through independent jobs and/or partial jobs. The two picking cells can, however, equally also be used to load the same output bin consecutively for working through a first and second partial job of a job.

Alternatively or additionally, the job management control can use the first and second picking cells selectively in parallel for working through different jobs and/or partial jobs or for a consecutive working through first and second partial jobs of a job in dependence on one or more jobs and/or partial jobs to be worked through.

In a possible embodiment of the present invention, the output bins can be conveyable over a direct conveying connection from the first picking cell to the second picking cell and/or back. Such a direct conveying connection permits the transport of the output bins from one picking cell to another picking cell without having to make a detour over the first and/or second conveying system.

Alternatively or additionally, the output bins can also be conveyable over the second conveying system from the first picking cell to the second picking cell and/or back.

Provision is made in a preferred embodiment that the job management control fetches and/or receives predefined goods properties of the goods to be picked by the job and compares them with the predefined goods handling properties of the at least first and second picking cells. An association of the job to one or more picking cells preferably takes place by this comparison. The job management control can in particular allocate the job to one of the picking cells in dependence on the comparison or can split the job into a plurality of partial jobs that are each allocated to different picking cells.

If all the goods of a job can be picked using one of the picking cells, the job is preferably allocated to this picking cell. If there is no picking cell with which all the goods of a job can be picked or if no such picking cell is available, the job management control preferably splits the job into a plurality of partial jobs that can each be picked by one picking cell and are associated therewith. The partial jobs in this case relate to the consecutive loading of the same output bin with goods in different picking cells. Different goods are preferably picked in the respective partial jobs.

An output bin is preferably transferred as part of the working through of the partial jobs of a job from a first picking cell in which a first partial job is worked through to a second picking cell in which a second partial job is worked through.

Provision is preferably made that the job management control additionally takes account of the workload of the picking cells due to other jobs in the event that a job and/or partial job can alternatively be worked through in a plurality of picking cells or in the event that a job can be split into partial jobs in a different manner. The workload of the individual picking cells can hereby be improved.

Provision can furthermore be made that the job management control fetches and/or receives predefined goods properties of the goods to be picked for a job and fixes a picking order for the goods of the job or partial job in dependence on the goods properties. The order in which the goods are to be transferred into the output bin can in particular thus be fixed.

The picking order can preferably be fixed such that heavy goods are picked before lighter goods of a job. It is hereby prevented that heavy goods lie on light goods and possibly damage them.

Provision can furthermore be made that the picking order is taken into account on the splitting of a job into partial jobs and/or in the allocation to different picking cells.

In a preferred embodiment of the present invention, the picking cells each have at least one robot arm at which the gripper is arranged. The robot arm thus provides the axes of movement over which the gripper is moved to grip goods from the supply bins and to transfer them into an output bin. The picking cells can in particular each have at least one 6-axis robot. Such 6-axis robots are known from a number of industrial applications and are therefore less expensive than special productions.

In a possible embodiment of the present invention, a picking cell can have two robot arms, preferably two 6-axis robots each having a gripper, that can be used in parallel for picking a job.

Alternatively or additionally, the picking cells each have at least one area gantry at which the gripper is arranged. Such an area gantry has at least two, and preferably three, linear movement axes. The gripper is preferably arranged via a gripper arm at the area gantry. The gripper arm preferably has one or more additional movement axes, in particular one or more rotary axes. An area gantry enables a more compact construction size.

In a possible embodiment, at least one picking cell can have two area gantries each having a gripper that can be used in parallel for picking a job.

Provision can furthermore be made in accordance with the invention that on a failure of a picking cell the job management control transfers the jobs and/or partial jobs allocated to this picking cell to different picking cells. The picking system is hereby less susceptible with respect to the failure of individual components.

In a preferred embodiment of the present invention, the cell control can control the gripper such that the goods are placed in an output bin at a predetermined position and/or with a predetermined orientation. The output bins can hereby be filled considerably more efficiently than by the dropping of the goods into the output bin known from the prior art.

Provision can alternatively or additionally be made that the job management control and/or the cell control determines the position and/or the orientation of all the goods of a job or partial job that are to be picked together in a job bin before the start of and/or during the picking.

A picking system in accordance with the invention has at least two automated picking cells in its basic design, i.e. a first picking cell and a second picking cell such as have been described above.

A picking system in accordance with the invention, however, preferably has more than two automated picking cells, further preferably more than five automated picking cells. All the picking cells do not have to have different handling properties and/or do not have to be used for working through different jobs and/or partial jobs. A plurality of first picking cells or a plurality of second picking cells can rather be provided, i.e. a plurality of identically set up and/or identically used picking cells can be provided. However, more than two differently set up and/or operated picking cells are preferably provided.

In a possible embodiment of the present invention, the picking system can additionally have a picking cell for a manual picking of goods. The picking cell thus also permits the picking of those goods that cannot be picked by any of the automated picking cells.

A picking system in accordance with the invention can furthermore have a plurality of sections for picking different goods categories. In a possible embodiment, the picking system in accordance with the invention comprises a first section having one or more picking cells and a second section having a plurality of picking cells, with the first and second sections being used for picking different goods categories. Alternatively or additionally, the first and second sections can be supplied with goods to be picked from different storage systems.

The first section can, for example, be used for picking refrigerated goods and/or deep frozen goods. Such goods are preferably picked in a separate section since they make special demands on the design and on the time procedures. This section is preferably also separately connected to a corresponding refrigerated store and/or freezer store.

The jobs are further preferably split into partial jobs by the job management control such that the partial job to be worked through by the first section forms the last partial job. This ensures that the goods category to be picked by the first section is the last to enter into the output bin. This is in particular of advantage in the picking of refrigerated goods and/or deep frozen goods by the first section since the cooling chain can hereby be more easily maintained.

In a preferred embodiment of the present invention, the first conveying system conveys the supply bins from a store to the picking cells and back. Alternatively or additionally, the second conveying system can convey the job bins from the picking cells to a shipment line. The picking system in accordance with the invention can in particular be designed such that fully picked output bins can move directly to shipping.

A picking cell used within the framework of the present invention can be set up or work in a manner such as the apparatus known from DE 10 2014 008 108 A1 for an automated removal of workpieces arranged in a bin. The picking cell can comprise a handling module described there and/or can comprise a supply module, a handling module, and an output module.

In addition to the picking system in accordance with the invention, the present invention furthermore comprises a set of a plurality of picking cells for a picking system such as has been described above. The set can in particular comprise a first and second picking cell having different goods handling properties. Such a set of picking cells can then be combined with a corresponding first and/or second conveying system and with a job management control to form a picking system in accordance with the invention.

The present invention furthermore comprises a job management control for a picking system such as has been described above and software for a job management control such as has been described above. The software in particular implements the above-named functions on the running of the job management control.

The cell controls of the individual picking cells can be integrated in the job management control. In this case, the job management control forms, together with the integrated cell controls, a higher ranking system for controlling a plurality of picking cells. In a preferred embodiment, however, each picking cell has its own cell control that receives job-related data from the job management control.

The job management control and/or the cell control can have one or more microprocessors and a memory in which a computer program is stored. When working through the computer program stored in the memory, the picking system is preferably controlled such that the functions described in more detail above are produced.

The present invention furthermore comprises a method of operating a picking system for a job-related picking of goods in output bins such as has been described above. Provision can in particular be made that at least one first picking cell is used for working through different jobs and/or partial jobs than a second picking cell and in particular that jobs having different job properties are allocated to different picking cells.

The method in accordance with the invention preferably takes place such as has already been described in more detail above with respect to the picking system in accordance with the invention.

The present invention will now be explained in more detail with reference to embodiments and to the drawings.

DETAILED DESCRIPTION

The picking system in accordance with the invention can form part of a material flow system or can form such a material flow system that ensures a reliable picking of any desired goods and in particular of articles of daily use and of industrial goods. The picking system, on the one hand, comprises different conveying systems and a plurality, preferably a multitude, of picking cells. An object detection of the goods provided in the supply bins takes place within the picking cells to grip said goods with a gripper and to transfer them to an output bin. The object detection device used for the object detection can in particular comprise a 2D camera and/or a 3D camera and/or a laser scanner.

The picking system is configured such that a multitude of goods can be picked in different sizes, configurations, and with different packaging properties.

FIGS. 1 to 4 show embodiments of a picking system in accordance with the invention. It has a plurality of automated picking cells 1 in which goods are removed from supply bins 4 and are transferred into an output bin 5. The individual picking cells each have an object detection system, not shown, for detecting the goods in a supply bin, a gripper for removing the goods from the supply bin and a cell control for evaluating the data of the object detection device and for a path planning and a control of the gripper. The gripper is preferably arranged at a gripper arm via which it is moved. The gripper arm can, for example, be the robot arm of a 6-axis robot. Alternatively, the gripper arm can be arranged at an area gantry.

The picking system furthermore has a first conveying system 2 with which supply bins are conveyed in which the goods to be picked are transported to the picking cells. The first conveying system furthermore serves to transport the supply bins 4 away from the picking cells again after the removal of the goods to be picked. The first conveying system is preferably connected to a storage system from which the supply bins are removed and to which they are returned.

In the embodiments shown in FIGS. 1 to 4, the first conveying system 2 has a bin feed 6 for supplying supply bins to the first conveying system, two conveying lines that supply different picking cells with the supply bins 4, starting from the bin feed, and two bin outputs. However, any other desired configurations of the conveying system are conceivable. In the embodiments shown in FIGS. 1 to 4, the conveying system has fixed conveying lines. In alternative embodiments, the conveying system could, however, for example, also be implemented via individual autonomously driving conveyor units such as pallet trucks.

The first conveying system is connected in the embodiment via conveying lines 10 to the individual picking cells 1, 1a and/or 1b. Supply Bins can be Moved from the First Conveying system into the picking cells and can be removed from the picking cells via the conveying lines 10. The conveying lines 10 can, however, also be part of the first conveying system.

The first conveying system 10 thus, on the one hand, permits the supply of supply bins to a picking cell. Furthermore, the transfer of a supply bin from a first picking cell to another picking cell is possible.

The embodiments shown in FIGS. 1 to 4 further have a second conveying system 3 with which output bins 5 can be transported onward to the individual picking cells 1, 1a and/or 1b and, after a completed picking, away from the picking cells. Output bins can furthermore be transferred from a first picking cell to other picking cells via the second conveying system. In the embodiments shown in FIGS. 1 to 4, the output bins can be exchanged in both directions between the individual picking cells. It would, however, also be conceivable only to provide a transport of the output bins in one direction between the picking cells.

In the embodiment, the second conveying system has a bin feed 8 for the output bins, a transport line 11 with which the output bins can be moved to the picking cells and between the picking cells, and a bin output 9. The bin output 9 is preferably connected to a shipment line. Empty output bins are preferably supplied via the bin input. The transport line 11 is preferably movable in both directions.

As is the case with the first conveying system, any desired configurations are also conceivable for the second conveying system. In the embodiments shown in FIGS. 1 to 4, fixed conveying lines are in turn provided. Alternatively, the transport of the output bins could also take place by autonomously driving conveying units such as pallet trucks. The second conveying system is, however, preferably designed with fixed conveying lines.

The individual picking cells each have one or more supply bin positions and one or more output bin positions that are located within the range of the gripper so that goods from supply bins that are located in such supply bin positions can be removed and goods can be transferred into output bins that are located in such an output bin position. The cells can have systems for channeling in and/or out via which the supply bins and/or output bins are transferred from the respective conveying systems into the corresponding supply bin positions and/or output bin positions. Alternatively or additionally, the supply bins and/or output bins can also be transferred directly into the respective positions via the respective conveying systems.

The object detection and the detection of the grippers by the cell control preferably takes place within the framework of the present invention such that the goods can be arranged in a non-ordered manner in the supply bins and can nevertheless be gripped and removed by the grippers. The individual automated picking cells are preferably configured such that the goods can be gripped independently of the height at which they are in the supply bin. The respective picking cells are therefore based on a bin picking algorithm.

In accordance with a first aspect of the invention, at least one first picking cell is used for working through different jobs and/or partial jobs than a second picking cell. The picking cells can in particular be used for working through jobs having different numbers of goods. Only jobs having a small number of goods can thus be allocated to a first picking cell, for example, while jobs having a larger number of goods are allocated to a second picking cell. In the embodiment shown in FIG. 1, a plurality of identical picking cells 1 are used that are used differently. The allocation of the jobs and/or partial jobs preferably takes place with reference to predefined allocation information on the individual picking cells.

In accordance with a second aspect of the present invention that can be combined with the first aspect, a plurality of picking cells having mutually different properties are used within the picking system. In the embodiment shown in FIG. 2, a first picking cell 1 and a second picking cell 1a having properties that differ with respect to the first picking cell are provided. The difference can, for example, be in the gripper, the gripper position, in the weight of the goods to be handled, the shape of the goods, the size, the material conditions, and the packaging properties. The embodiment further comprises a third picking cell 1b having properties that differ with respect to the first and second picking cells. The system can comprise further picking cells 30 that have the same properties as one of the first, second, or third picking cells or different properties.

Figure 1:
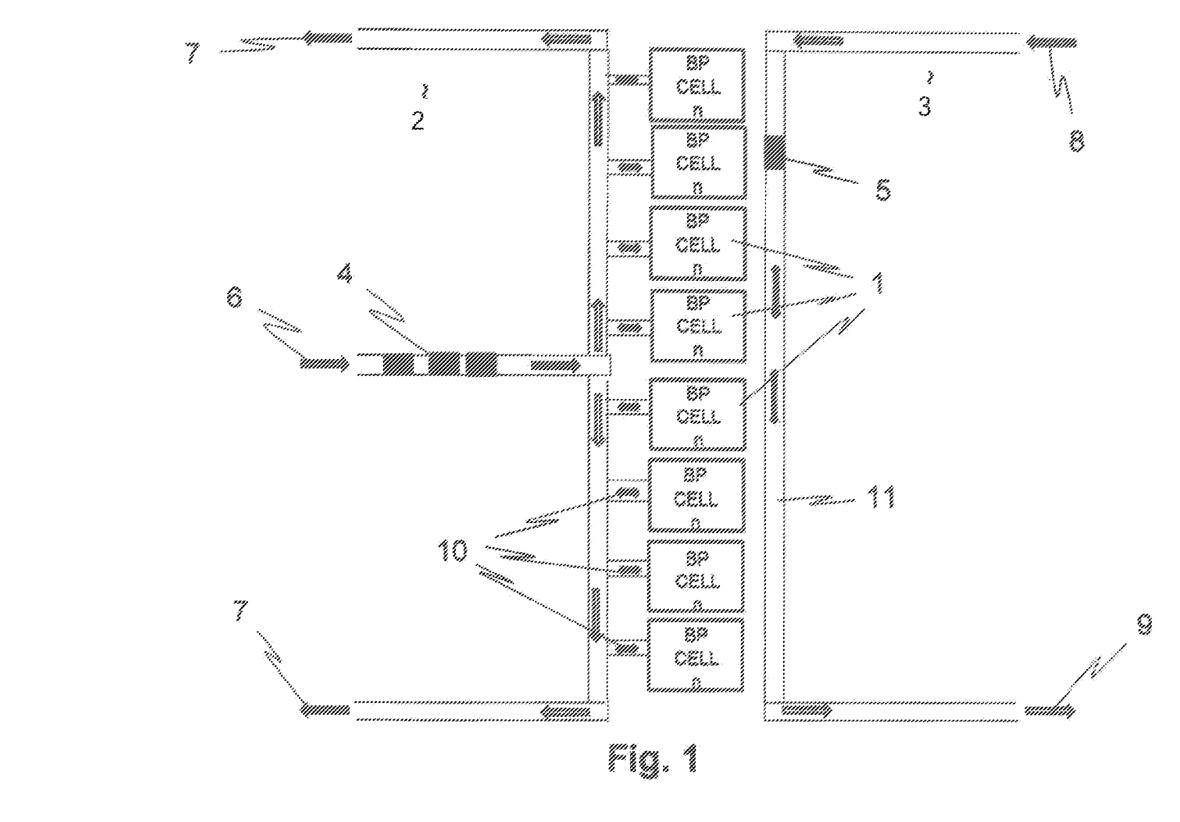
FIG. 1 shows a first embodiment of a picking system in accordance with the invention with identically designed picking cells.
Figure 2:
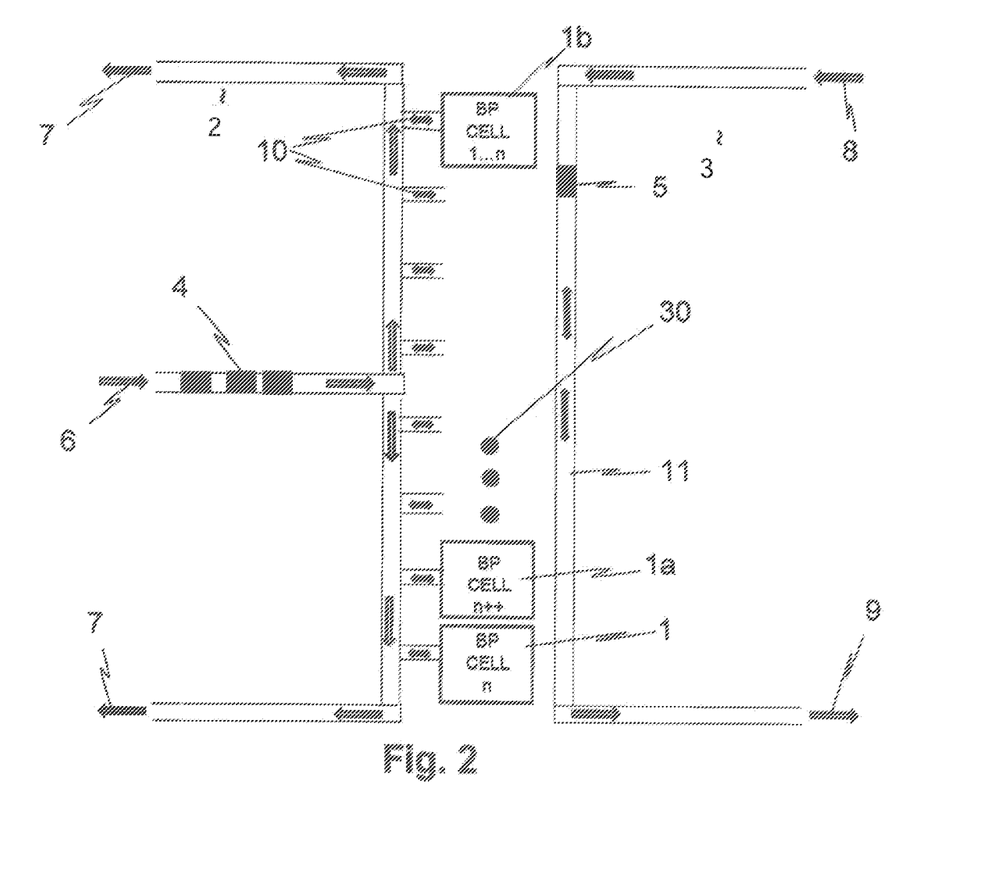
FIG. 2 shows a second embodiment of a picking system in accordance with the invention with differently designed picking cells.

The picking system has a job management control, not shown, in which the respective allocation information for the cells 1 of the first embodiment and/or cell properties of the picking cells 1, 1a, 1b, and 30 of the second embodiment are stored. On an entry of an order, the goods properties of the goods to be picked by the job are determined and the ideal bin route for the output bins 5 between the individual picking cells is determined therefrom. For this purpose, a job is either associated with a single picking cell or is split into different partial jobs that are each associated with different picking cells by a comparison of the demands resulting from the goods properties and of the allocation information and/or the cell properties. An order in which the partial jobs are worked through is furthermore fixed. The route of the output bins between the picking cells results from this.

The workload of the picking cells from other jobs and/or partial jobs can be taken into account on the splitting into partial jobs or on the fixing of the order of the partial jobs. If a picking cell provided for a job or partial job is working to capacity by another job or partial job, the job management control can take this into account in the order of the working through of the partial jobs and can first start the loading of the output bin at a different picking cell and can subsequently move to the one or more occupied picking cells.

Furthermore, goods properties of the goods to be picked that are to be picked within the partial jobs can be taken into account in the order of the partial jobs. The shape and the weight and/or the kind of the article can in particular be taken into account on the splitting into partial jobs and/or in the order of the partial jobs. It is hereby in particular ensured that heavy articles move into the output bins in first place to avoid possible damage to other articles. The taking into account of the shape and/or size of the goods can furthermore be necessary to achieve an optimum utilization of space within the bins and/or to realize a compact filling ready for shipping.

The goods in the picking cells can preferably be placed in the output bins with a defined position and/or orientation. The arrangement of the goods within the bin is preferably determined on the basis of the goods properties.

At least two picking cells preferably have handling properties. At least two picking cells can thus have different grippers to be able to ensure that different goods shapes and/or kinds can be picked. The grippers are preferably moved via a robot. It is furthermore conceivable to use robots of different sizes to be able to work through heavy articles and extremely light articles in separate picking cells. A picking cell for picking gummi bear packs thus, for example, has a suction gripper, a picking cell for gripping small articles has a mechanical gripper, for example a 2-finger gripper or 3-finger gripper, etc. To be able to pick a sack of potatoes, for example, the robot has to be adapted such that it can handle this weight.

In a possible embodiment, at least one picking cell can have two different grippers to be able to implement jobs having different gripper demands with the same picking cell. The grippers are preferably each arranged separately at a robot and can therefore be moved separately. The two robots can therefore take over the work of two picking cells due to the different gripper properties. The splitting of certain jobs into two partial jobs can hereby be avoided since a greater class of jobs can be completely worked through by such a picking cell.

The picking system in accordance with the invention offers the advantage that in the event of a failure of a picking cell, the failure can be compensated by means of the other picking cells by a replanning. In the event of a failure, the association of the jobs to the picking cells is preferably modified by the job management control such that the remaining jobs are split among the remaining picking cells.

As stated above, the picking cells do not necessarily have to be configured differently within the framework of the present invention. It is rather conceivable within the framework of the present invention that the picking cells are of identical design, but are used for working through different jobs. The picking cells can in particular be used for working through jobs having different numbers of goods. Only jobs having a small number of goods can thus be allocated to a first picking cell, for example, while jobs having a larger number of goods are allocated to a second picking cell. The picking system preferably has at least two picking cells having different picking properties, however, The picking system in accordance with the invention can have a multitude of picking cells. More than two differently designed picking cells are preferably used, further preferably more than three differently designed picking cells.

The picking system can furthermore comprise a picking cell for a manual picking of goods. Articles that cannot be picked by means of the automated picking cells can hereby be fully picked manually by a corresponding operator.

The first conveying system 2 ensures that at least one supply bin filled with articles is conveyed into the picking cell so that the picking robot can remove the required goods. In a possible embodiment, the first conveying system can already channel the bin of a job to be subsequently picked to save time on a change between two jobs. The picking robot completes the first job in order subsequently to immediately begin with the next job. The removed articles are placed in job-related output bins and are conveyed out of the cell by means of the second conveying system 3 and are either transferred to a shipment line or to the next cell.

Figure 3:
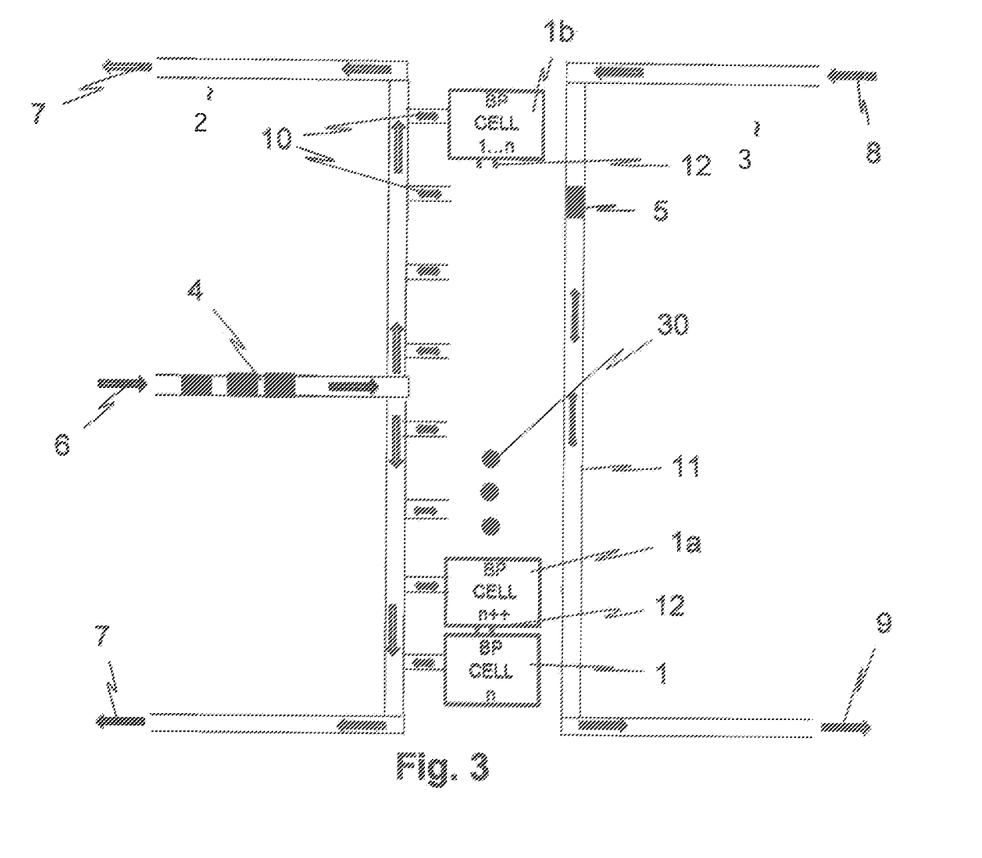
FIG. 3 shows a third embodiment of a picking system in accordance with the invention with direct conveying connections between the picking cells.

In the embodiment shown in FIG. 3, provision is furthermore made that individual picking cells are directly connected to one another via a conveying system 12 so that the output bins can be channeled out of a picking cell in a direct manner and can be channeled into the next picking cell. As shown in FIG. 3, individual picking cells can be directly connected to one another in this manner while there is no such direct connection between other picking cells. The transfer of the output bins then takes place via the second conveying system here.

Figure 4:
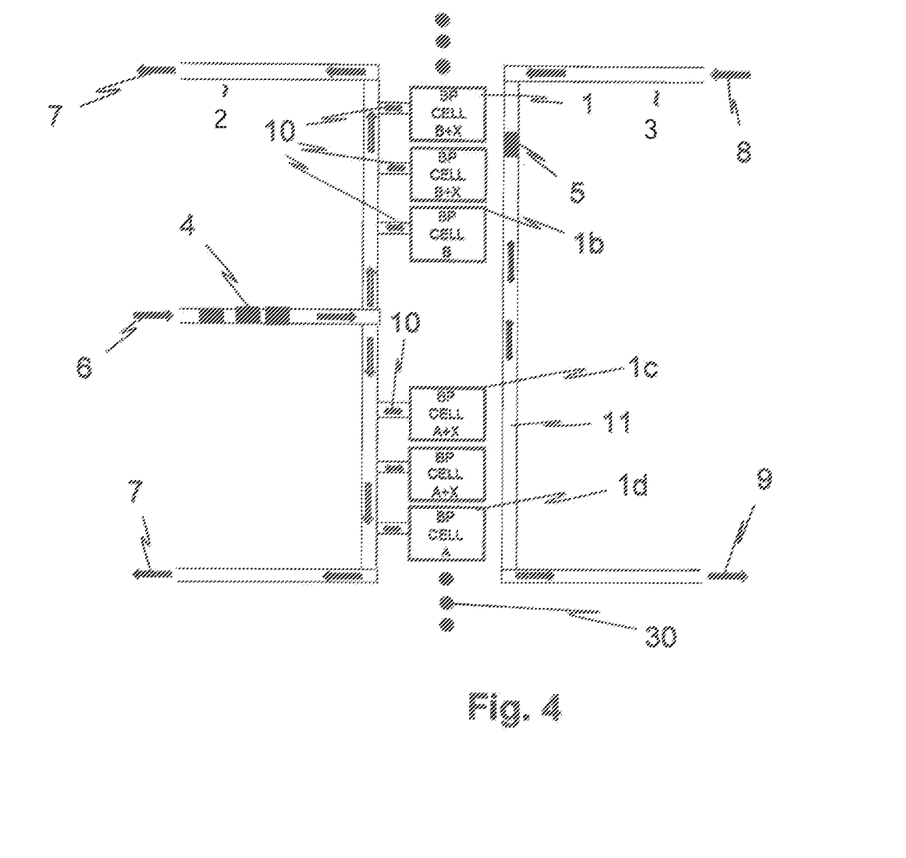
FIG. 4 shows a fourth embodiment of a picking system in accordance with the invention with two different sections for picking different goods categories.

As furthermore shown in the embodiment shown in FIG. 4, the picking cells can be split into article groups. In the embodiment shown in FIG. 4, a first group is provided that is built of picking cells 1 and 1b and a second group of picking cells is provided that is built of picking cells 1c and 1d. The picking cells located within a group can in turn differ by their properties. Alternatively, identical picking cells can also be used within a group. The picking cells of a first group preferably differ from the picking cells of a second group. The system can comprise further picking cells 30 that form one or more further groups.

Such a division is in particular sensible when there is a large material flow system or when the articles to be picked react very differently to external conditions or require very different external conditions. There is, for example, the possibility of picking deep frozen foods in a separate group of picking cells. The control in this case preferably takes place such that deep frozen foods are picked last. The first group of picking cells 1 and 1b in FIG. 4 can thus be used, for example, to pick all the goods that do not require any cooling. The second group of picking cells 1c and 1d is used for picking refrigerated foods or deep frozen foods. The individual jobs are preferably split into partial jobs such that the partial jobs associated with the second group are worked through after the partial jobs associated with the first group.

The embodiments shown in FIGS. 3 and 4 otherwise correspond to the embodiments shown in FIGS. 1 and 2.

Figure 5:
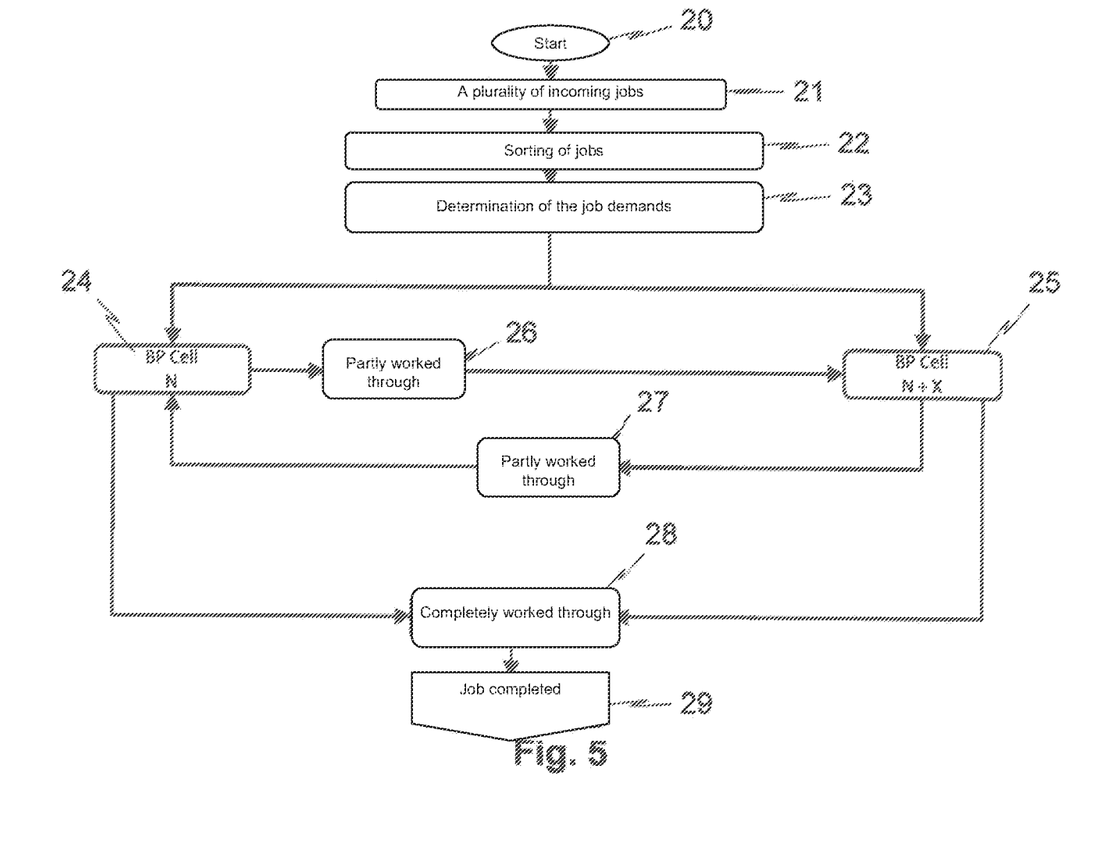
FIG. 5 shows a flowchart of an embodiment of a method in accordance with the invention.

FIG. 5 shows an embodiment of a method in accordance with the invention that can in particular be worked through using one of the picking systems shown in FIGS. 1 to 4.

The method starts in step 20 and waits for jobs. One or more jobs arrive in step 21. The jobs are sorted in step 22. Job demands and in particular goods properties of the goods to be picked within a job are determined in step 23. They are compared with handling properties of the available picking cells.

A job can be associated with one of the picking cells and can be worked through by such a picking cell in step 24 or in step 25. Depending on the job demands, the job is associated with a picking cell comprising corresponding handling properties.

If necessary, a job can also be split into a plurality of partial jobs that are associated with different picking cells. A first partial job can thus be worked through in a first picking cell in step 24. Then, in step 26, the output bin of the only partially worked through job is transferred into a second picking cell where a further partial job is worked through in step 25. A job can also be split into more than two partial jobs so that the corresponding job bin is transferred from one picking cell to another picking cell a plurality of times.

An output bin can in particular be transferred to the first picking cell in step 27 after the working through of a partial job in the second picking cell in step 25 to work through a further partial job in step 24.

If all the partial jobs of a job have been worked through or if the job was not split into partial jobs and has been completely worked through, the output bin is transferred to a shipment line in step 28 so that the corresponding job can be concluded in step 29.

The invention claimed is:

1. A picking system for a job-related picking of goods in output bins, said picking system comprising:
    a plurality of automated picking cells in which goods are removed from supply bins and are transferred into an output bin, wherein the picking cells each have an object detection device for detecting the goods in a supply bin and a first picking cell has different goods handling properties than goods handling properties of a second picking cell;
    a gripper for removing the goods from a supply bin;
    a cell control for evaluating the data of the object detection device and for path planning and control of the gripper;
    a first conveying system for the supply and/or discharge of the supply bins to and/or from the picking cells;
    a second conveying system for the supply and/or discharge of the output bins to and/or from the picking cells; and
    a job management control for: working through a plurality of picking jobs by controlling the first and second conveying systems and the plurality of picking cells; allocating first goods to be picked to the first picking cell based on a comparison of the goods handling properties of the first picking cell and goods properties of the first goods; and allocating second goods to be picked to the second picking cell based on a comparison of the goods handling properties of the second picking cell and goods properties of the second goods, wherein the goods properties of the second goods are different from the goods properties of the first goods.

2. The picking system in accordance with claim 1, wherein the first picking cell has a different gripper and/or a different maximum handling weight than the second picking cell; and/or wherein the first and second picking cells permit the picking of goods and/or the filling of output bins of different sizes.

3. The picking system in accordance with claim 1, wherein the job management control assigns the first picking cell for the picking of a first sub-group based on predefined goods properties and assigns the second picking cell for the picking of a second sub-group of goods based on predefined goods properties, with the first and second sub-groups differing with respect to predefined goods properties of at least one of weight, the size, the shape, the packaging properties and the kind of goods.

4. The picking system in accordance with claim 1, wherein the job management control uses the first picking cell for the picking of a first sub-group of jobs or partial jobs and the second picking cell for the picking of a second sub-group of jobs or partial jobs, with the first and the second subgroups differing with respect to predefined job properties of at least one of the number, the weight, the size, the shape, the packaging properties, and the kind of goods to be picked per job or partial job and/or a priority of the job or partial job.

5. The picking system in accordance with claim 1, wherein the first and second conveying systems are configured such that the first and second picking cells can be used in parallel for working through different jobs and/or partial jobs and for the consecutive working through of a first and second partial job of a job; and/or wherein the job management control selectively uses the first and second picking cells in parallel for working through different jobs and/or partial jobs or for the consecutive working through of a first and second partial job of a job in dependence on one or more jobs and/or partial jobs to be worked through.

6. The picking system in accordance with claim 1, wherein output bins can be conveyed via a direct conveyor connection to osr from the first picking cell to the second picking cell, and/or wherein output bins can be conveyed via the second conveying line to or from the first picking cell to the second picking cell.

7. The picking system in accordance with claim 1, wherein the job management control fetches and/or receives predefined goods properties of goods to be picked by a job for the working through of the job and compares them with predefined goods handling properties of the at least first and second picking cells; wherein the job management control allocates the job to one of the picking cells in dependence on the comparison or splits it into a plurality of partial jobs that are each allocated to different picking cells; wherein an output bin is transferred as part of the working through of the partial jobs of a job from a first picking cell in which a first partial job is worked through to a second picking cell in which a second partial job is worked through; and wherein the job management control additionally takes account of a workload of the picking cells due to other jobs.

8. The picking system in accordance with claim 1, wherein the job management control fetches and/or receives predefined goods properties of the goods to be picked by a job for working through a job and fixes a picking order for the goods of the job in dependence on the goods properties; wherein heavy goods are picked before lighter goods of a job; and/or wherein the picking order is taken into account in the splitting of a job into partial jobs and/or in the allocation to different picking cells.

9. The picking system in accordance with claim 1, wherein the picking cells each comprise one or more of a robot arm or area gantry.

10. The picking system in accordance with claim 1, wherein the cell control controls the gripper such that the goods are placed in an output bin at a predetermined position and/or with a predetermined orientation; and/or wherein the job management control and/or the cell control determines the position and/or orientation of all the goods of a job or partial job that are to be picked together in one job bin before the start of and/or during the picking.

11. The picking system in accordance with claim 1, comprising more than 3 automated picking cells, wherein a plurality of first picking cells and/or a plurality of second picking cells are provided; and/or comprising a picking cell for a manual picking of goods; and/or
   a picking system comprising a first section having one or more picking cells; and a second section having one or more picking cells, wherein the first and or second sections are used for picking different goods categories or are supplied with goods to be picked from separate storage systems; and wherein at least the first section is used for picking refrigerated products and/or deep frozen products and further jobs are split into partial jobs such that the partial job to be worked through by the first section forms the last partial job.

12. The picking system in accordance with claim 1, wherein the first conveying system conveys the supply bin from a store to the picking cells and/or back; and/or wherein the second conveying system conveys the job bins from the picking cells to a shipment line.

13. The picking system in accordance with claim 1, wherein the picking cells include a set of picking cells.

14. A picking system for a job-related picking of goods in output bins, said picking system comprising:
   a plurality of automated picking cells in which goods are removed from supply bins and are transferred into an output bin, wherein a first picking cell has different goods handling properties than goods handling properties of a second picking cell;
   an object detection device of each picking cell for detecting the goods in a supply bin;
   a gripper for removing the goods from a supply bin;
   a cell control for evaluating the data of the object detection device and for path planning and control of the gripper;
   a first conveying system for the supply and discharge of the supply bins to and from the picking cells;
   a second conveying system for the supply and discharge of the output bins to and from the picking cells, and
   a job management control performing a plurality of picking tasks by controlling the first and second conveying systems and the plurality of picking cells, assigning at least one first picking cell for working through different tasks than a second picking cell, allocating first goods to be picked to the first picking cell based on a comparison of the goods handling properties of the first picking cell and goods properties of the first goods, and allocating second goods to be picked to the second picking cell based on a comparison of the goods handling properties of the second picking cell and goods properties of the second goods, wherein the goods properties of the second goods are different from the goods properties of the first goods.

15. The picking system of claim 14, wherein the first and second conveying systems are configured such that the first and second picking cells can be used in parallel for working through different tasks and for the consecutive working through of a first and second partial job of a job; and wherein the job management control selectively uses the first and second picking cells in parallel for working through different tasks or for the consecutive working through of a first and second partial job of a job in dependence on one or more tasks to be worked through.

16. The picking system of claim 14, wherein the picking cells each comprise one or more of a robot arm and/or area gantry.

17. A method comprising:
   operating a picking system for picking of goods in output bins, at least a first picking cell is assigned different jobs and/or partial jobs than a second picking cell, and the first picking cell has different goods handling properties than goods handling properties of the second picking cell;
   allocating first goods to be picked to the first picking cell based on a comparison of the goods handling properties of the first picking cell and goods properties of the first goods, and
   allocating second goods to be picked to the second picking cell based on a comparison of the goods handling properties of the second picking cell and goods properties of the second goods, wherein the goods properties of the second goods are different from the goods properties of the first goods.

18. The method claim 17, wherein the goods handling properties of the picking cells are one or more of: a type of gripper, a gripper position, and maximum handling weight; and
   the goods properties of the goods to be picked are one or more of: weight of the goods, shape of the goods, size of the goods, material conditions, and packaging properties.

19. The method claim 17, wherein a job of picking goods is split into partial jobs; a first partial job is assigned to the first picking cell based on the goods handling properties the first picking cell and the goods properties; and a second partial job is assigned to the second picking cell based on the different goods handling properties of the second picking cell and the goods properties.

* * * * *